SAMUEL WITZ
LEE T. CARLETON
HOWARD H. ANDERSON
RUDOLPH H. MOYER
HAROLD A. NEUFELD
INVENTORS

BY Edward O. Ansell
Arthur Decker

United States Patent Office 3,690,837
Patented Sept. 12, 1972

3,690,837
AUTOMATIC BIOLOGICAL AGENT DETECTOR
Samuel Witz, Los Angeles, Calif., Lee T. Carleton, Northport, N.Y., Howard H. Anderson, Covina, and Rudolph H. Moyer, West Covina, Calif., and Harold A. Neufeld, Frederick, Md.; said Witz, Anderson, and Moyer assignors to Aerojet-General Corporation, El Monte, Calif., and said Neufeld assignor to the United States of America as represented by the Secretary of the Army
Filed July 6, 1970, Ser. No. 52,606
Int. Cl. G01n 21/26, 33/16
U.S. Cl. 23—254 R    7 Claims

ABSTRACT OF THE DISCLOSURE

Apparatus for detecting biological agents such as vegetative bacteria, spores and viruses, capable of operating satisfactorily when supplied with minute samples of material to be tested, even when present in a continuous background of matter similar in nature. The equipment utilizes the phenomenon of chemiluminescence and, more particularly, provides the proper conditions for chemiluminescence of luminol by hydrogen peroxide, operating in an intermittent flow system supplied with the agents by an aerosol particle collector, and in which detection of the chemiluminescence is by a photomultiplier tube the output of which is monitored. Photomultiplier output could be recorded on a chart, magnetic tape or merely designed to set off an alarm when values exceed a prescribed threshold.

BACKGROUND OF THE INVENTION

The detection and quantitation of specific biological organisms, especially of small amounts existing in a continuous background of similar matter, has been the subject of considerable attention in recent years by those concerned with air and water pollution, biological warfare, food purification, the efficiency of sterilization methods, etc. From these efforts, there has evolved a technique for such detection which is quite advantageous in several respects since it is versatile, rapid, inexpensive, easily managed and accurate. This technique involved the phenomenon of chemiluminescence, i.e., the emission of light as a result of a chemical reaction with little or no concurrent production of heat. However, the usual chemiluminescent detectors of micro-organisms which are available are not capable of providing rapid and continuous detection and quantitation of extremely small numbers of organisms against normal background interferences.

BRIEF SUMMARY OF THE INVENTION

The equipment to be described in this specification is free of the above deficiencies to a great extent. It involves the use of luminol (5-amino-2,3-dihydro-1,4-phthalizinedione) a substance which has the unusual property of luminescing, under proper conditions, when activated by hydrogen peroxide, in a reaction catalyzed by the substance hematin, a substance which is almost universally found in living organisms. Hematin catalyzes the chemiluminescence of luminol by peroxide either in its (hematin's) free state or in combination with protein-forming hemoproteins such as catalase or hemoglobin.

Specifically, in one mode of its operation, the equipment monitors the light produced when hydrogen peroxide is injected into a reactor cell containing a mixture of luminol and a hematin source (i.e., in the form of bacteria) to thereby provide a measure of the latter in a test sample. In another of its modes, the apparatus provides for reaction of a premix of luminol and hydrogen peroxide as a single reagent with the hematin source in a reactor and, in still another mode, the apparatus provides for chemiluminescence testing of a biological agent prestained with hemin chloride or hematin so that even vegetative bacteria or spores or virus which may not initiate chemiluminescence (since they may contain little or no hematin), may be detected. In addition to the above, the apparatus includes integral equipment capable of filtering and concentrating the sample bacterial stream operative automatically and under hygienic conditions after being set for desired intervals of effectiveness of its operations.

DESCRIPTION OF THE PREFERRED EMBODIMENT

Figure 1:
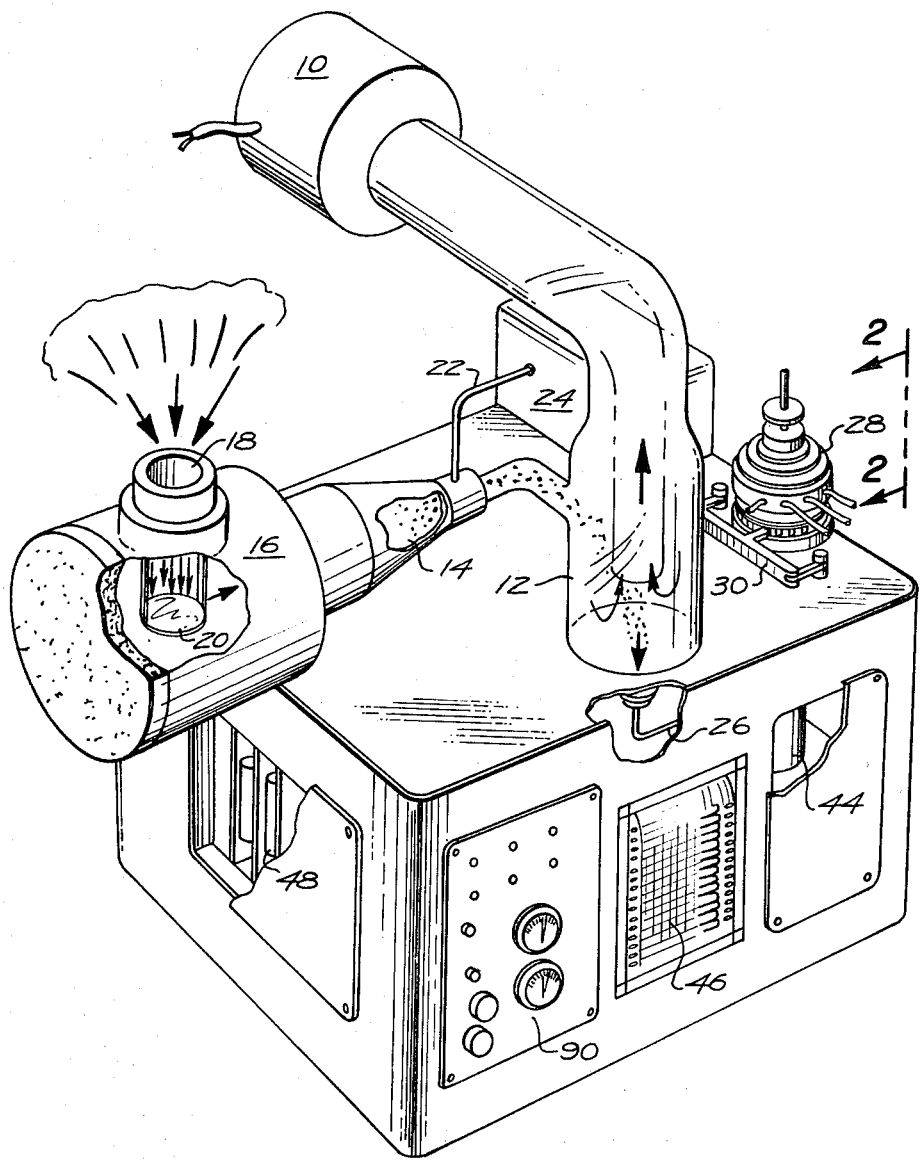
FIG. 1 shows the automatic chemiluminescent biological agent detector comprising the present invention with certain structural parts broken away to provide some indication of its operation.

FIG. 1 shows the preferred embodiment of the detector of the present invention, a device capable of monitoring and measuring the increase in chemiluminesence produced by catalysis by metal porphyrin, occurring in organisms, of an aqueous solution of alkaline luminol and hydrogen peroxide. This reaction is virtually instantaneous and entails in one mode of operation, mixing a stream of alkaline luminol containing hydrogen peroxide with incoming collector fluid containing the porphyrin-carrying agents. The emitted light, which is linearly dependent upon the number of organisms present, is registered by a photomultiplier tube, amplified and recorded. A filtering and concentrating unit provides accumulation and intermittent release of pulses of organisms in the collector fluid, thereby increasing sensitivity and reliability.

Specifically, in FIG. 1, blower 10 provides air flow in the direction indicated by the arrows through collector 12, aspirator 14 and chamber 16 from the outside atmosphere to be checked for organisms. Air containing the biological particulates enters port 18 in chamber 16 and strikes preimpactor 20. The latter, consisting of a glass disc coated with an appropriate adhesive film serves to retain particles of size exceeding that of the organisms of interest. The desired airborne particles impinge in aspirator 14 on droplets of collector fluid (which may be water, aqueous sodium borohydride or other salt solution) introduced as a fine mist through tube 22. The collector fluid is pumped from a reservoir (not shown) within the housing of the apparatus by means of pump 24. The mist containing the bacteria then coalesces into a liquid stream and is separated from the air stream in the small cyclone of the collector 12, which can be caused by arranging the conduit carrying the mist to enter the collector tangentially. The organism-carrying stream is then pumped from the collector through tube 26 into filter-concentrator 28.

Figure 2:
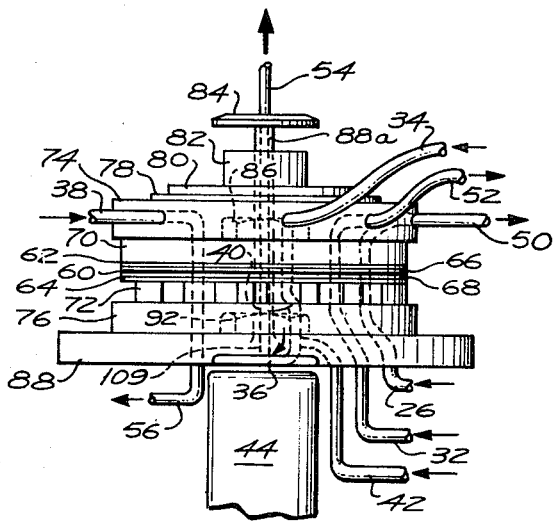
FIG. 2 is a side view of the filter-concentrator of the detector as viewed along lines 2—2 of FIG. 1.

It is the function of filter-concentrator 28, also shown in closeup in FIG. 2, to concentrate and wash the organisms before the reagents are permitted to affect them. In the first position of its indexing mechanism 30, it accumulates the organisms entering via tube 26 on the surface of a filter through which the stream is passed for a predetermined time interval; in its second position, it provides a wash for the organisms by a fluid such as water, entering through tube 32; in its third position, it releases the organisms to reactor cell 36 in a coherent pulse through tube 40 by backwashing the filter with fluid such as urea, entering through tube 34; and, in its fourth position, its filter is cleaned in preparation for the next organism pulse by fluid such as water containing detergent, entering through tube 38.

The organism-containing fluid in reactor cell 36 is then mixed with reagent entering via tube 42 (connecting to tube 40) and the resulting illumination captured by photomultiplier 44 and converted to an electrical signal which is amplified in amplifier 48 and recorded by recorder 46.

It is, of course, clear that fluid flows in the apparatus are accomplished by pumps (not shown) connected to reservoirs and receptacles in its housing, which are energized in proper sequence by, for instance, the cams of a timing device (also not shown). These devices and their operation and the electronic circuitry which records either the intensity of the light flash or the integrated light output or sets off an alarm when values exceed a prescribed threshold are considered sufficiently well known to experimenters in this and associated arts to require no further elaboration here.

It is further apparent that tubes 50, 52, 54 and 56 are for the waste and wash fluids drained off after the various operations at the corresponding positions of filter-concentrator 28 are completed, as follows: tube 50 for collection fluid after deposit of organism (first position); tube 52 for organism wash fluid (second position); tube 54 for organism sample after test (third position); and, tube 56 for filter cleaning fluid (fourth position) in preparation for succeeding tests.

Figure 3:
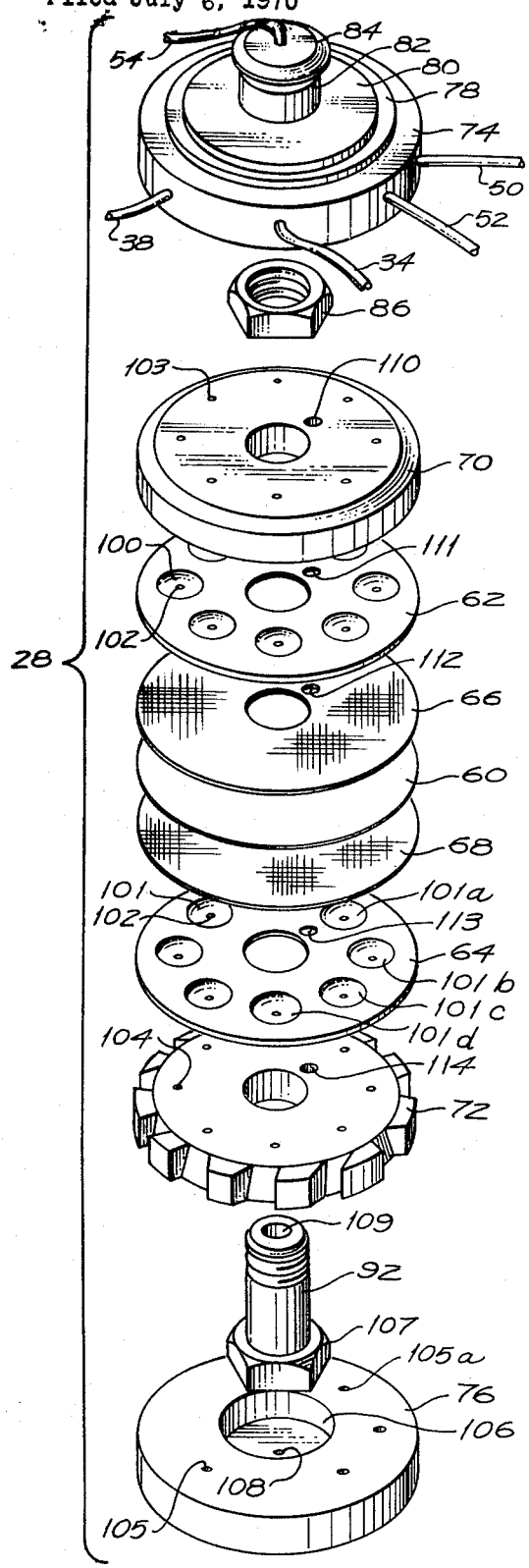
FIG. 3 is an exploded view of the filter-cencentrator of FIG. 2.

FIG. 3 provides a disassembled view of filter-concentrator 28 which shows its component parts to better advantage. The preferred structure comprises a single filter 60, which may be an appropriate membrane sandwiched between a pair of cavity discs 62, 64 of an inert material such as Teflon, and separated from the latter by a pair of screens 66, 68 of, preferably, stainless steel, which contributes support for filter 60. Cavity discs 62, 64 serve as gaskets and face seals against metal pressure plates 70, 72, to define the port area (8 ports shown) at each position of indexing mechanism 30 (FIG. 1) and also to minimize the liquid volume into which the organisms are backwashed in the third position of filter-concentrator 28 (the sensitivity of the test is directly proportional to the concentration of organisms in the backwashed volume of fluid). Components 60, 62, 64, 66, 68, 70 and 72 are squeezed tightly together into a leakproof assembly by hollow hub bolt 92 and nut 86. Port plates 74, 76 are preferably of Teflon and provide for ingress and egress of fluids and, of course, are ported correspondingly to pressure plates 70, 72. Mounted about port plate 74 are the following: key plate 78, to insure proper orientation of port plate 74 when filter-concentrator 28 is assembled; disc spring 80, to maintain uniform rotary seal pressure regardless of temperature fluctuations; collar 82, to space and take up the thrust of spring 80; and, hand-operated nut 84, which tightens on the threaded end of spindle plate 88, the plate end of which is secured to the chassis and it is noted that indexing causes rotation of only filter 60, discs 62, 64, screens 66, 68 and plates 70, 72; the other components are stationary.

Operation of the equipment will be clearly understood from the following more detailed description and explanation. Depressions 100 and 101 of the respective discs 62 and 64 are in the form of dished areas juxtaposed to each other and located in pairs at the surfaces of the respective discs, the upper depression 100 of a pair being dished upwardly and the lower depression of the pair being dished downwardly so that together they form a cavity containing the filter 60 and which can retain an amount of fluid sent into them. These cavities do not extend all the way through the thickness of the cavity discs excepting for small ports 102 extending through the disc from each cavity. Since there are eight cavities, spaced equidistant from each other somewhat inside the outer periphery of the respective discs, there will likewise be eight of these ports 102 equi-spaced from each other around each disc. Eight similarly spaced and dimensioned ports 103 and 14 pass through the pressure plates 70 and 72 respectively such that they line up with the respective eight ports 102 of the cavity discs. The lower port plate 76 is provided with four of these similarly-dimensioned ports 105 through it which registers with four of the ports 104 of pressure plate 72. The conduits 26, 32, 42 and 56 are connected to the underside of corresponding ports extending through the stationary spindle plate 88, which also register with the respective four ports 105 of stationary port plate 76. The conduits 50, 52, 34 and 38 fixed to the upper port plate connect with four adjacent ones of its ports which register with four adjacent ports 103 of the pressure plate 70, corresponding in position with the above-mentioned four ports 105 of lower port plate 76.

Before completing the final assembly of the stack, the members 64, 68, 60, 66 and 62 will be squeezed between the pressure plates 70 and 72 by passing hollow bolt 92 through the central openings of these members and tightening this group between the pressure plates by tightening nut 86 down on plate 70 with bolt head 107 against the bottom side of plate 72.

The lower port plate 76 is provided with a cylindrical well 106 entering the plate from its upper surface but not passing entirely through the plate. The bottom of this well 106 is provided with an opening 108 through which there can extend the hollow spindle 88a fixed to and passing through spindle plate 88. The bolt head 107 is rested in the well 106 of port plate 76 and the spindle 88a is passed through the internal hollow of the bolt 92 and up through port plate 74, through the collar 82 to the nut 84 which is threaded on the upper end of the spindle 88a to hold this entire assembly between the spindle plate 88 and the nut 84. The tube 54 is inserted into the hollow of the spindle 88a at its upper end. The bolt head 107 is free to rotate in well 106 so that the elements 60, 62, 64, 66, 68, 72, 86 and 92 rotate on indexing. Plate 76 is fixed to spindle plate 88 by a pin in plate 88 which enters a matching hole in plate 76. The upper port plate 74 is held in its position on the spindle 88a by suitable means (not shown) such as a pin or key in key plate 78 which enters a groove in the side of spindle 88a and a registering groove at the central hole of plate 74.

The reactor cell 36 is shaped to fit within a recess in the underside of the spindle plate 88 and at least its lower wall should be of a transparent material such as glass so that the photomultiplier 44 placed in close proximity thereto, will receive light from the cell when it becomes luminescent. The cell 36 may be made by attaching a sheet of transparent material to coincide with the plane of the lower face of the spindle plate, while the walls of the recess of the spindle plate may serve as part of the walls of the reactor cell. The port 109 formed by the hollow of the spindle and its extension through the spindle plate communicates with the reactor cell, and likewise the conduit 42 also communicates with the reactor cell by way of a port through the spindle plate from the conduit 42.

The key plate 78 with its key means prevents relative rotation between it and the port plate 74, thereby maintaining the angular position of port plate 74 so that its ports are positioned to correspond with the positions of the corresponding ports of port plate 76.

The elements 70, 62, 66, 60, 68, 64, and 72, which are rotatable in unison, are each provided with registration holes 110, 111, 112, 113, and 114 respectively such that a registration pin (not shown) fitted through all these holes maintains the proper alignment of the ports and cavities of this rotary portion of the device, while the remaining elements being stationary are held in their proper aligned positions by the bolt 92.

In the operation of the system, the timing device (which can be any suitable type of timer) can, for example, conveniently be a cam operated timer, such that cams attached to a timing motor shaft or the like will operate the index mechanism 30 intermittently and at prescribed times established by the timer and its cams. The timer allows the cavity plates to remain in each position for the prescribed time, for example, about half a minute, and then moves them to the next position for its prescribed time. Thus, the timer will operate on the rachet wheel of plate 72 to move the rotary mechanism to its first position, for example, where the particularly cavity 101a is in communication with the particular port 105a of the port plate 76, at which time material containing the organisms under test, which is continuously under pressure as by a pump, is sent through conduit 26 into cavity 101a and onto the underside of the filter, after which the timer will move the ratchet wheel of plate 72 to put the same cavity into its second position 101b for its allotted time, which will cause flow of the washing fluid through conduit 32 to wash the organisms on the filter for a period of time also determined by the timer. Then, the timer will move the rachet wheel so that the same cavity will occupy the position 101c, at which time, the backwash fluid will be pumped through conduit 34 to the upper surface of the filter and through it, to send the organisms down to the reactor cell 36. The next movement of the timer will then move the same cavity to the position 101d at which position the filter cleaning fluid will be pumped through conduit 38, through the filter, and out of conduit 56. In this same position and concurrently with this filter cleaning operation the conduit 42 is in communication with the reactor cell so that the pressurized reagent, for example, a mixture of luminol and hydrogen peroxide, is pumped or sent through conduit 42 and into the reactor cell, which at this time already contains the organisms, so that a flash of light occurs in the cell which will be detected by the photomultiplier and indicated or recorded on the indicator. Suitable housing will be provided for the reactor cell and photomultiplier to prevent the photomultiplier from receiving light except from the cell.

The remaining four ports of the eight port system can be connected to conduits and to the timing system and pumped to operate in the same way as the first-mentioned four ports.

It will be observed that, although only four positions of filter-concentrator 28 are required for a test, eight positions are provided; as a result, tests may be repeated or run in tandem from different input sources or test conditions may be varied.

Thus, with respect to the last-mentioned alternative, it has been discovered that results, particularly test sensitivity, are dependent upon whether or not the reagents are separately added to the organism-containing fluid or premixed and added to it as conglomerate. The detector of the present invention provides for such different modes of operation, i.e., it is not limited to any reagent or mixture or, as a matter of fact, to any prescribed type of unknown organism. For instance, operation has been successful in the following modes: testing for bacteria by adding luminol and hydrogen peroxide separately to the sample fluid in reactor cell 36 or by backwashing (third position of filter-concentrator 28) with a mixture of urea and luminol and then adding the peroxide; testing for bacteria by adding a premix of luminol and hydrogen peroxide to the sample fluid; testing for spores (low in hematin) after adding hemin, in the form of the chloride, to the incoming collector fluid, since the hemin chloride, which is an effective catalyst for initiation of luminol chemiluminescence, is readily adsorbed on the surface of biological agents. Excess hemin chloride may be removed from the stained agents in filter-concentrator 28 during the concentration and wash cycles.

It is additionally to be observed that the equipment may also be used in the analysis of liquid suspensions of organisms which, of course, do not require the use of a collector as do aerosols. These may be introduced into the system by way of tube 26 for direct feed into filter-concentrator 28.

From the above description, it is apparent that the detector of the present invention utilizes porphyrin-catalyzed luminescence for detection and assay of a number of biological agents (vegetative bacteria and spores, virus and virus carrier) from the hemin moiety which may be present in the organism or attached to it by staining with hemin chloride or hematin. It thereby comprises an instrument admirably able to accomplish the objects herein stated as desirable in a laboratory analytical tool.

What is claimed is:

1. A biological agent detector capable of forming a stream of fluid containing the agent of microscopic size which act as a catalyst in a luminescent reaction comprising means to isolate agents of predetermined size; means to form a droplet stream of fluid carrying the agents from said isolating means; means to filter and accumulate for a predetermined time the agents in the stream from said forming means; means to wash the agents accumulated on said filter means; a reactor cell; means to backwash the agents on said filter means into said reactor cell; and means to add to said reactor cell reactants capable of luminescing when catalyzed by the agents in said reactor cell.

2. The detector of claim 1 in which said isolating means and said filtering means comprise membranes.

3. The detector of claim 2 in which said stream forming means comprises an aspirator.

4. The detector of claim 1 in which said reactant adding means comprises a plurality of reactants and means to syphon each of said plurality of reactants separately into said reactor cell.

5. The detector of claim 1 in which said reactant adding means comprises a plurality of reactants in the form of a premix and means to syphon said premix into said reactor cell.

6. The detector of claim 1 in which the agents comprise bacteria and the reactants comprise luminol and hydrogen peroxide.

7. The detector of claim 1 in which the agents comprise a filterable biological agent inherently containing an insufficient amount of hematin to initiate luminescence by itself and the reactants comprise luminol, hydrogen peroxide and hemin.

References Cited
UNITED STATES PATENTS 3,287,089  11/1966  Wilburn _____ 23—230 R
3,520,660  7/1970  Webb _____ 23—253

MORRIS O. WOLK, Primary Examiner

R. E. SERWIN, Assistant Examiner

U.S. Cl. X.R.

23—230 B, 232 R; 195—103.5 R, 127